(12) United States Patent
Sankuratripati et al.

(10) Patent No.: US 7,155,508 B2
(45) Date of Patent: Dec. 26, 2006

(54) TARGET INFORMATION GENERATION AND AD SERVER

(75) Inventors: Subhash Sankuratripati, Mountainview, CA (US); Jaideep Srivastava, Sunnyvale, CA (US); Dinesh K. Shanbhag, Sunnyvale, CA (US)

(73) Assignee: Yodlee.com, Inc., Redwood Shores, CA (US)

( * ) Notice: Subject to any disclaimer, the term of this patent is extended or adjusted under 35 U.S.C. 154(b) by 741 days.

(21) Appl. No.: 09/827,011

(22) Filed: Apr. 4, 2001

(65) Prior Publication Data

US 2002/0029267 A1 Mar. 7, 2002

Related U.S. Application Data

(63) Continuation-in-part of application No. 09/654,320, filed on Sep. 1, 2000, now abandoned.

(51) Int. Cl.
G06F 15/173 (2006.01)
(52) U.S. Cl. ...................................... 709/224
(58) Field of Classification Search ................ 709/224, 709/203, 205, 207, 217, 250
See application file for complete search history.

(56) References Cited

U.S. PATENT DOCUMENTS

| | | | |
|---|---|---|---|
| 5,740,549 A | | 4/1998 | Reilly et al. |
| 5,854,897 A | | 12/1998 | Radziewicz et al. |
| 5,913,040 A | * | 6/1999 | Rakavy et al. ............... 709/232 |
| 5,933,811 A | * | 8/1999 | Angles et al. ................. 705/14 |
| 5,948,061 A | * | 9/1999 | Merriman et al. .......... 709/219 |
| 6,119,098 A | | 9/2000 | Guyot et al. |
| 6,134,532 A | | 10/2000 | Lazarus et al. |
| 6,138,155 A | | 10/2000 | Davis et al. |
| 6,230,199 B1 | * | 5/2001 | Revashetti et al. .......... 709/224 |
| 6,393,407 B1 | * | 5/2002 | Middleton et al. ............. 705/14 |
| 6,477,575 B1 | * | 11/2002 | Koeppel et al. ............. 709/224 |
| 6,665,715 B1 | * | 12/2003 | Houri .......................... 709/223 |
| 6,836,799 B1 | * | 12/2004 | Philyaw et al. ............. 709/224 |

OTHER PUBLICATIONS

U.S. Appl. No. 09/654,320, Srivastava.

\* cited by examiner

*Primary Examiner*—Thomas Pham
(74) *Attorney, Agent, or Firm*—Donald R. Boys; Central Coast Patent Agency, Inc (57) ABSTRACT

An advertisement selection and delivery system for selecting advertisements based on profile information and rendering the advertisements as accessible to a user operating a network-capable appliance connected to a data-packet-network is provided. The system comprises, a first server node connected to the network, the first server node functioning as a user access point on the network, a mass storage repository accessible to the first server node, the repository for storing and serving user profile data, a second server node connected to the network, the second server node for generating user preference data, at least one advertisement server connected to the network, the advertisement server for serving advertisement data, a software application for generating user preference lists and performing advertisement selection and at least one network-capable appliance connected to the network the network-capable appliance for receiving the advertisement data. A user operating the network-capable appliance accesses the first server node and receives the advertisement data, the advertisement data selected for service by matching the user preference data to stored advertisements and rendered accessible to the user during the time of user access to the system from the network-capable appliance.

31 Claims, 4 Drawing Sheets

TARGET INFORMATION GENERATION AND AD SERVER

CROSS-REFERENCE TO RELATED DOCUMENTS

The present invention is a continuation-in-part (CIP) to patent application Ser. No. 09/654,320 entitled "Method and Apparatus for Multifaceted Profiling of Individual Cobrand Users" filed on Sep. 1, 2000, now abandoned disclosure of which is incorporated herein in its entirety herein by reference.

FIELD OF THE INVENTION

The present invention is in the field of Internet-based services and applications, and pertains more particularly to methods for generating a concise data package containing target information about a user for the purpose of directing ad generation to an interface employed by the user.

BACKGROUND OF THE INVENTION

The information network known as the world-wide-web (WWW), which is a subset of the well-known Internet, is arguably the most complete source of publicly accessible information available. Anyone with a suitable Internet appliance such as a personal computer with a standard Internet connection may access (go on-line) and navigate to information pages (termed web pages) stored on Internet-connected servers for the purpose of gathering information and initiating transactions with hosts of such servers and pages.

Often times, in order to improve the quality of services offered by a particular website, it is important to understand user activity in relationship to that site. This is to say that while a user is navigating through a website, obtaining a dynamic profile of the user's habits, activities and personal information would prove beneficial to the overall improvement of a service providing or commercial website. In addition to utilizing user profiles for website service-enhancement purposes, companies routinely pay for such information in order to better target users for advertising and marketing purposes.

In a cobrand relationship known to the inventor, cobrand partners contract with a service-providing entity in order to provide Internet services offered by the entity. The cobranded services are made available to subscribers of the cobrand partners through dedicated servers maintained by the service-providing entity. Users who subscribe to such services typically have at least some personal profile information known to the cobrand partners through their normal subscription and interaction activities. In addition, a service-providing entity may track certain information about users who are accessing and interacting with cobranded services maintained by the service-providing entity. For example, information such as types of products purchased, types of web pages accessed at service sites, frequency of buying, time spent at sites, and so on, may be tracked and stored in a secure database by the service-providing entity. This is made possible by the fact that the service-providing entity maintains and provides the services and the equipment through which the services are made available.

There are a variety of known methods for obtaining information about individual users who visit websites online. Some commonly known methods are sending and retrieving interactive cookies, conducting on-line surveys, parsing completed online forms, recording purchase histories, and many other techniques. A typical user profile automatically compiled by a Web company is limited to information that can be obtained from the user while at one of the company-sponsored sites, or through interacting with the user during registration processes. As such, the profile is not complete or well rounded and tends to reflect content related to the nature of business conducted by the Web company. For example, a purchase history compiled by a Web-based clothing retailer is limited to the subject of clothing. In order to obtain a well-rounded profile of an individual that covers a variety of topics, information must be bought, sold, or traded between Web companies doing business on the Internet. It is known in the art that there are many companies in existence that specialize in information brokering. In the case of cobranding, where the service-providing entity provides proxy navigation and data summary services for users, data about a user's activity related to interaction with cobrand services includes data related to a plurality of disparate Web-sites, which are involved in some aspect of the cobrand services. It has occurred to the inventor that much information may be automatically obtained about users from user interaction and proxy interaction with many Web sites without being required to obtain the data through purchase or trade with companies hosting Web-sites involved in cobranded services.

A system known to the inventor and taught in the related document listed in the cross-reference enables automated collection of data about a user through monitoring user interaction on the network. The data-collection system includes a proxy server connected to the data-packet-network for providing proxy services and for monitoring user access and interaction with those services, a dedicated server interface connected to the network for providing user access to the proxy services, and a software application running on the proxy server for collecting and storing data obtained as a result of active user-interaction with the proxy services. In preferred embodiments of the invention, the data is collected in an automated fashion and is used for the construction of multifaceted user profiles, which may be periodically updated in an automated fashion as a result of continued user interaction with provided proxy services through the dedicated server interface.

The system also incorporates manual techniques used in data collection and integrates results obtained manually with those obtained in an automated fashion to compile detailed profiles of individual users. One of the uses of a complete and detailed profile on a user is to incorporate the compiled information for use in advertising as is generally known in the art. However, in an automated network environment ads must be delivered into user-operated interfaces as accessed web pages are loaded. In current art, ads delivered according to profiling, either text or graphic, are more or less static in that they do not change in content to the extent that a user may change in personal habits, preferences, or other profiled attributes. These ads are decided on based on an overall picture of a user or a group of users. Therefore, they are not really as flexible or target-oriented as might be desired by both users and advertising companies.

It has occurred to the inventors that through further innovation and refinement, an automated profiling system may be adapted to define a user's profile in such a way as to incorporate slight changes in content, categories, and preferences as they are discovered. However, in order to cause ads to be delivered such that they incorporate evolving changes, a system must be developed to communicate the mean of those changes in a way that may be utilized on the fly as Web pages delivered into a user interface are loaded.

What is clearly needed is a system for packaging and communicating profile data to ad sources such that dynamic ads may be selected and delivered based on mean changes in the profile data. Such a system would provide a much greater degree of compliance of delivered ads to a user's preferences and status states enabling a greater hit rate and a greater profit margin for ad companies.

SUMMARY OF THE INVENTION

In a preferred embodiment of the present invention, an advertisement selection and delivery system for selecting advertisements based on profile information and rendering the advertisements as accessible to a user operating a network-capable appliance connected to a data-packet-network is provided. The system comprises, a first server node connected to the network, the first server node functioning as a user access point on the network, a mass storage repository accessible to the first server node, the repository for storing and serving user profile data, a second server node connected to the network, the second server node for generating user preference data, at least one advertisement server connected to the network, the advertisement server for serving advertisement data, a software application for generating user preference lists and performing advertisement selection, and at least one network-capable appliance connected to the network the network-capable appliance for receiving the advertisement data.

In a preferred use, a user operating the network-capable appliance accesses the first server node and receives the advertisement data, the advertisement data selected for service by matching the user preference data to stored advertisements, which are rendered accessible to the user during the time of user access to the system from the network-capable appliance.

In a preferred embodiment, the system is implemented on the Internet network. In addition to being connected to the Internet, the first server node and the second server node are, in one embodiment, connected to each other by a separate dedicated network. The software application is, in one implementation, distributed in part on the second server node and in part on the at least one advertisement server. In this aspect, the part of the software application executing on a second server node directs generation of user preference lists and the part of the software application executing on the at least one advertisement server performs the advertisement selection according to a user preference list obtained from the second server.

In another aspect, the software application resides in whole and executes on the second server node and advertisement selection is performed by the second server node using advertisements delivered thereto from the at least one advertisement server. In this aspect, the second server node also serves the selected advertisements, functioning as an ad broker. Also in some aspects, the first server node is a cobranded server node servicing clients of a cobrand partner of the entity hosting the system. In this aspect, the advertisements may include e-mail messages or instant messages. However, in preferred aspects, the advertisements served are banner and text advertisements.

In one aspect, the network-capable appliance accesses the system through a wireless network. In another aspect of the system, the preference lists are generated using a knowledge base data system. In still another aspect, the preference lists are used as search criteria in conjunction with a search engine.

In another aspect of the present invention, a preference-data generation server for generating preference data using data mined from user profile data is provided. The server comprises, a data port for receiving user profile data, a data port for accessing a knowledge database and a software application for mining the user profile data and for generating preference summaries by equating the mined profile data to pre-established preference categories listed in the knowledge database. In all aspects, the preference summaries are generated in the form of categorized and prioritized data lists.

In one embodiment, the preference-data generation server further comprises, a data port for receiving pre-configured advertisement data, a data port for serving advertisement data and a software application for matching the advertisement data to individual ones of generated data lists and for selecting the advertisement data most closely matching the generated data lists for service. In a preferred aspect, the matching advertisement data is served to a network-access point established on a data-packet-network, which, in preferred instances, is the Internet network. The preference-data generation server, in one aspect, further comprises a data port for serving the prioritized data lists. In this aspect, the prioritized data lists are served to at least one advertisement server operating on a data-packet-network, which is the Internet network. Also in this aspect, the process of selecting advertisements is performed by the at least one advertisement server.

In another aspect of the present invention, a method for dynamically serving advertisement data based on user profile information to a user interface maintained on a data-packet-network is provided. The method comprises the steps of, (a) compiling and storing the user profile information on an ongoing basis, (b) accessing the user profile information in order to mine the information, (c) mining the accessed user profile information for preference data, (d) formulating the preference data into a concise summary-data list, (e) selecting pre-configured advertisements from a database containing stored advertisements, the selection accomplished by matching the advertisements to data contained in the summary-data list and (f) serving the selected advertisements to the user interface.

In a preferred embodiment, the method is practiced on the Internet network. In a preferred aspect of the method in step (a), compilation of user profile information is accomplished by recording user activity on the network. In another aspect, in step (a), compilation of user profile information is augmented through manual data procurement methods. In a preferred aspect of the method, steps (b)–(f) are performed as a sequence launched as a result of the profiled user connecting to and accessing the user interface using a network-capable appliance.

Further to the above, in step (c), data mining is accomplished through a parsing method. Also, in step (c), the preference data is, in preferred embodiments, categorized and prioritized according to preconfigured preference categories related to types of advertisements. In one aspect of the method, in step (d), the summary-data list is of the form that can be propagated through the network. In this aspect, in step (d), the summary-data list is sent to an advertisement server wherein the advertisement server performs steps (e) and (f). In still another aspect, steps (c)–(f) are accomplished by a single server node connected to the network. In one aspect of the method in step (e), the advertisements are generated to fit the summary-data list and are of the form of instant messages advertisements. In another aspect, in step (e), the advertisements are generated to fit the summary-data list and are in the form of emailed advertisements.

Now, for the first time, a system for packaging and communicating profile data to ad sources such that dynamic ads may be selected and delivered based on mean changes in the profile data is provided. Such a system provides a much greater degree of compliance of delivered ads to a user's preferences and status states enabling a greater hit rate and a greater profit margin for ad companies.

DESCRIPTION OF THE PREFERRED EMBODIMENTS

Figure 1:
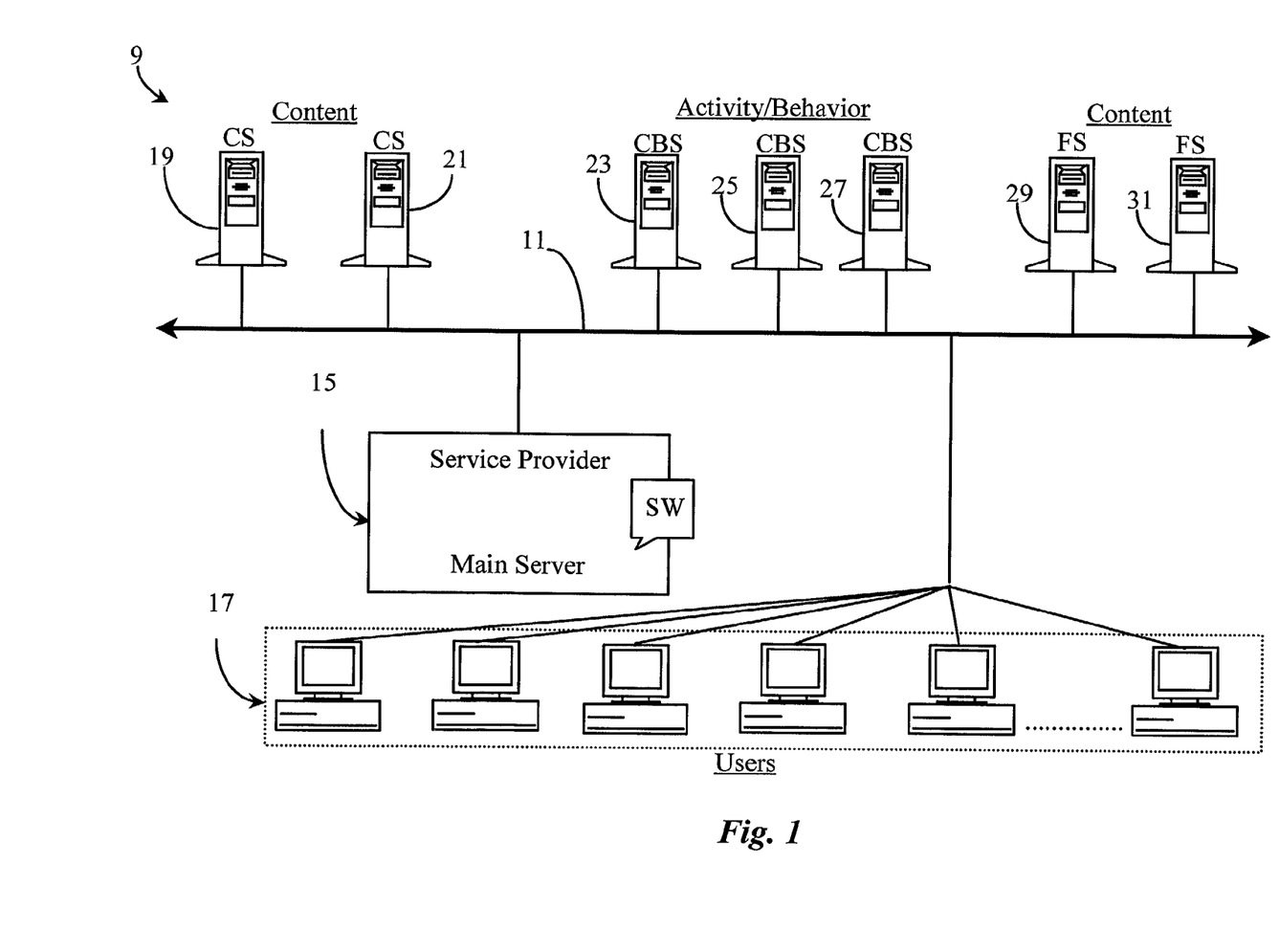
FIG. 1 is an overview of a communication network wherein cobrand user-profiling is practiced according to an embodiment of the present invention.

FIG. 1 is an overview of a communication network 9 wherein cobrand-user profiling is practiced according to an embodiment of the present invention. Communication network 9 contains all of the equipment and network connections required in order to establish a functional network-communication capability.

In a preferred embodiment of the present invention, communication network 9 is implemented on the Internet network, which is represented herein by an Internet backbone 11. Internet backbone 11 represents all of the lines, connection points, and equipment that make up the Internet network as a whole. Therefore, there is no geographic limit to the practice of the present invention.

A plurality of cobrand servers (CBS) 23, 25, and 27 are illustrated, in this example, as connected to Internet backbone 11. CBS 23–27 are adapted as Internet file servers dedicated to users of cobrand services provided by a service-providing company, which also maintains the servers. A main server 15, also illustrated as connected to Internet backbone 11, is adapted as a data-aggregation and distribution source and is hosted by the same service provider hosting servers 23–27. Cobrand servers 23–27 are dedicated to cobrand partners and their subscribers whom have elected to access services offered by the service provider, which hosts server 15.

In addition to data-aggregation and distribution services (cobrand service) server 15 also functions, in this example, as an activity-tracking server tracking on-line activity of cobrand users. Companies providing cobrand services to their subscriber-ship typically specialize in providing search capabilities and limited portal services. The companies hosting CBS 23–27 may be termed cobrand partners of the described service-providing company. The nature of services provided by CBS 23–27 will depend on the nature of agreements forged between various cobrand partners and the service-providing entity. For example, some of CBS 23–27 may allow users to obtain e-mail from various e-mail servers. Likewise, each of CBS 23–27 may provide varying functionalities generally related to data collection, aggregation and summary services. It is sufficient to say that subscribers to cobranded services interface with CBS 23–27 in order to receive such services.

A plurality of content servers (CS) 19 and 21 are adapted as Internet data servers hosted by companies contracted to provide specific content to the service-providing entity, which makes the content available through CBS 23–27. Servers 19 and 21 are illustrated herein as connected to Internet backbone 11.

CS 19 and 21 are dedicated to providing specific Web content such as weather information, stock quotes, financial news, entertainment news, and so on. There are many possibilities as to the nature of the content provided by servers 19 and 21. In some cases content provided by servers 19 and 21 may be inaccessible without subscription or membership. It is noted herein that CS 19 and 21 are not, in this example, hosted by the entity hosting main server 15 and cobrand servers 23–27 rather, they are hosted by companies contracting with the service-providing entity of this example and provide content according to contract stipulation.

A plurality of Free (FS) content servers 29 and 31 are illustrated herein as connected to Internet backbone 11. FS 29 and 31, located to the right of CBS 23–27, in this example, and are also adapted as Internet data servers, but in this case are not providing content to CBS 23–27. FS 29–31 are not in any way associated with the entity hosting main server 15, however, in some cases may be accessed through main server 15 by proxy such that accessed content may also be tracked by main server 15. Like CS 19–21, there are many possibilities as to the nature of content provided by FS 29–31, the term "free" is used in this example to convey that the services and/or content provided within FS 29–31 is available to anyone who accesses it.

It will be apparent to one with skill in the art that there may be many more CBS, CS, and FS illustrated in this example without departing from the spirit and scope of the present invention. The inventor illustrates only a few of each class of server in this example and deems the illustration sufficient for explanation of the present invention. It is repeated here that CBS 23–27 are cobrand servers maintained by a service-providing entity also hosting main server 15. CS 19–21 are content servers hosted by companies contracting with the described service-providing entity to make their content available to CBS 23–27. FS 29–31 are free servers not affiliated in any way with the service-providing entity.

A plurality of cobrand subscribers/users 17 (within dotted rectangle) is illustrated as having Internet connection to Internet backbone 11. Internet connection in this example includes all of the known methods for accessing the Internet network. An internet-service-provider (ISP) is not detailed in this example, but may be assumed to be present in a scenario where users 17 are accessing Internet 11 through normal dial-up modem technology, which is most common. Other methods include wireless modem connection, cable modem connection, and so on.

In this example, users 17 are illustrated as operating personal computers (PC) to access Internet 11. In actual practice, any Internet-capable appliance may be used to practice the present invention as long as it has network-browsing and display capabilities. Each user 17 may freely navigate to and interact with CBS 23–27, FS 29–30, or CS 19–21. However, when users are accessing cobrand services from one of CBS 23–27, at least part of the service enables them to have data obtained from any of CS 19–21 or FS 29–31. For example, if a user 17 is logged into CBS 27 to receive cobrand services, specific data requested by the user such as weather or financial news would be obtained by proxy from CS 19–21 because of contract stipulation. If data is requested from any of FS 29–31, then the requesting user must provide information such as a URL address and type of data required to enable proxy data collection and presentation because there is no affiliation between FS 29–31 and CBS 27.

Main server 15, as previously described, can log the activities of each of users 17 when they are interacting with CBS 23–27. Furthermore, server 15 has the ability to record activity information related to any proxy data request involving any other servers navigated to on behalf of users 17. As a result, much data specific to a user's activity may be obtained without giving notice to or requesting data from companies hosting servers 19–21 or servers 29–31.

An instance of software (SW) is provided to execute on main server 15. SW at server 15 is adapted to record any user-activity data routed through server 15. Therefore, data obtained through cobrand services offered by CB 23–27 may be logged and identified to particular users, and mined for data to include as profile data. Server 15 may record types of content requested, description and class of items purchased, nature and description of Web-sites targeted for data requests, frequency of same type requests, lists containing URLs and descriptions of user-registered Web sites, and so on. Data about a cobrand user's on-line activity and behavior is compiled and organized within server 15 and then stored as a part of that user's multifaceted profile.

Other information about users may be obtained from companies hosting CBS 23–27. Such information may include personal information related to subscription and registration to receive cobrand services, information obtained through registration and interaction with a cobrand partners regular services routinely accessed by cobrand users, and so on. In this way, much of a multifaceted profile can be automatically generated and stored for cobrand users 17. If a user is a frequent cobrand user and is particularly prolific with on-line activity, then many facets about that user's activity and behavior may be learned and recorded. Profiling a user in this manner greatly reduces the need for trading or purchasing partial profiles compiled by a plurality of un-related sources. However, a multifaceted profile may, of course be enhanced by supplementing the profile with purchased or traded data originating from out-side sources.

Significant market advantages exist for an entity that can obtain a multifaceted profile on each of its clients. For example, many user profiles may be mined for more specific data, which may be generated into list-reports detailing preferences and activity traits of many users. Such lists may be created and tailored for advertisement companies or other service providers willing to pay for the information. Thresholds and special rules may also be implemented during profile configuration and maintenance such that profile information may be automatically updated over prolonged user patronage of cobrand services.

Figure 2:
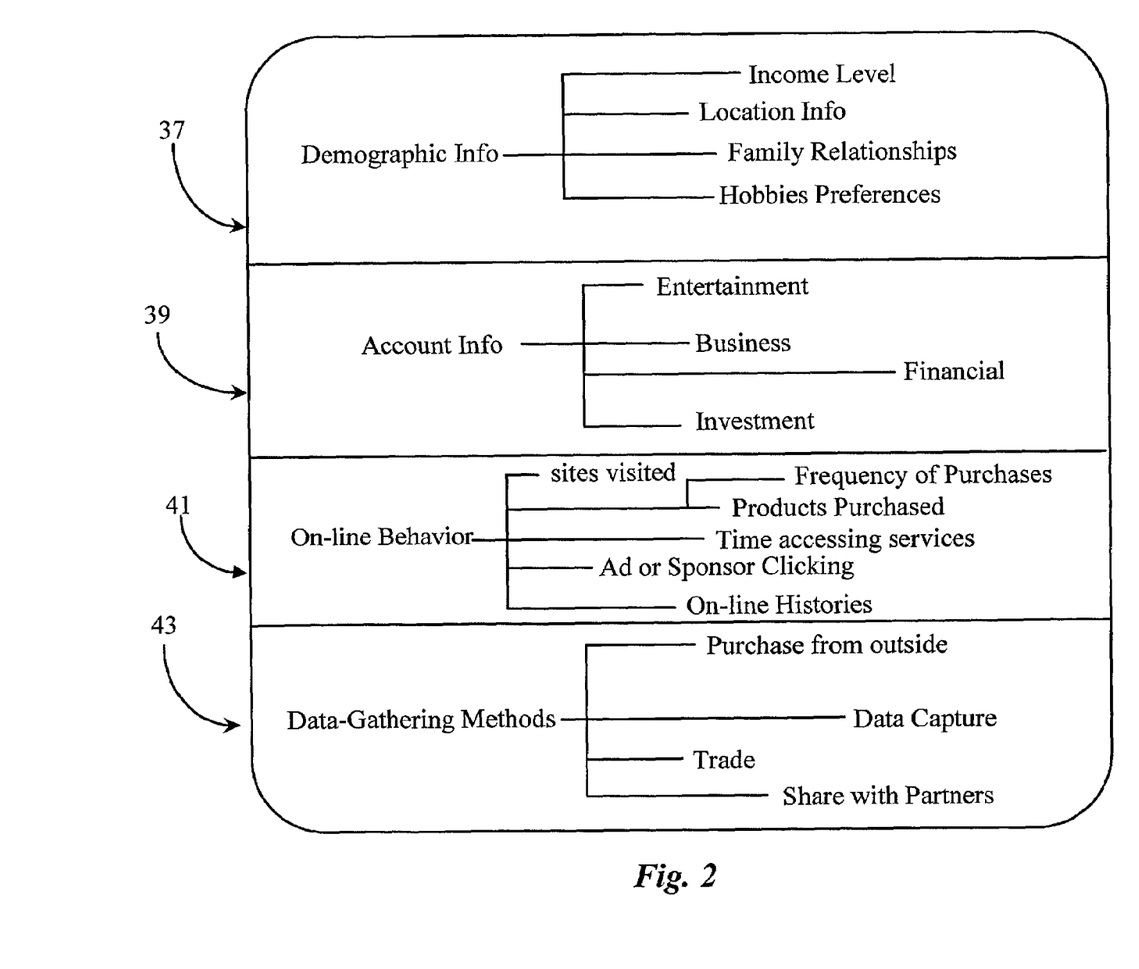
FIG. 2 is a block-diagram illustrating various data categories and data-gathering methods used to create a multifaceted user-profile according to an embodiment of the present invention.

FIG. 2 is a block-diagram illustrating various data categories and data gathering methods used to create a multifaceted user-profile according to an embodiment of the present invention. In this example, there are three basic categories of data used to create a dynamic multifaceted profile. These categories are illustrated in this example, by element number 37 (demographic info), element number 39 (account info), and element number 41 (on-line behavior). Element number 43 represents various data-gathering methods, which may be used to obtain data described in the data categories mentioned above.

Every cobrand user is supplied with a cobrand identification (ID) and a member ID. In this way, data obtained and warehoused from internal or external sources is easily identifiable to a particular user. Profiles may be automatically assembled using this warehoused data according to enterprise rules. It is important to note herein that each data category 37, 39, and 41 may be populated using automatic data-gathering methods (element 43) such as data capture during interactive sessions. Data capture, as is used in this specification, means recording any and all data about a user during an on-line session, which includes any proxy services. Of course, some data may be supplied by purchasing from the outside, trading, or sharing with partners. These additional options are included under data-gathering methods 43. For the most part however, automated data capture should be sufficient for supplying a viable multifaceted profile in most cases. This is especially true if a user is prolific in his or her patronage of cobranded services.

Referring now to demographic info 37, there is illustrated a plurality of subcategories, which will be discussed from top to bottom. Income level is one important subcategory of demographic information. By knowing a user's income level, advertisements for travel, financial services, and consumables may be more properly tailored for the individual. Location information may also be used to enhance local advertising.

Family relationships are important for understanding lifestyle characteristics, identifying future consumers, and so on. Gender, age, and income levels of family members may also be important in creating a multifaceted profile. Hobbies and other preferences may also be included in data gathered for demographic information. Such data also contributes to understanding lifestyle characteristics and identifying products and services that may fit a user.

Demographic information may be obtained through recording on-line purchase events, registration events, and from general population of on-line forms. Therefore, most demographic information may be obtained through automated data-capturing techniques. In some cases, companies contracting for cobrand service-enhancement with a service-providing entity may simply forward or share some demographic information. Such an arrangement may be, in some embodiments, required as part of contract negotiation. In other cases, especially if certain users are not prolific in on-line activity, demographic information may be purchased from the outside or obtained through trade with outside organizations. Therefore, information that cannot be obtained through data capture may be obtained through other methods in order to supplement any relatively weak profiles.

Account information 39 is illustrated herein as divided into 4 basic subcategories. These subcategories are listed from top to bottom as entertainment, business, financial, and investment. Each category may be further divided into more subcategories has deemed appropriate. Account information represents data obtained from on-line accounts belonging to a particular user. A user may subscribe to many of these accounts and may add them to cobrand service sites for the purpose of being able to access information from such accounts without physically navigating to them. As proxy services are performed on behalf of a user concerning a user's registered accounts, data used in accessing the accounts and data returned as a result of task performance is collected and incorporated as profile data.

As data is automatically compiled about a user over time, the user's profile becomes more and more valuable and accurate. After a period of time, the service-providing entity maintaining the cobrand services and the user's profile may generate automated reports detailing certain aspects of the user's profile for selective distribution to paying clients. Secure information such as credit card numbers, Social Security numbers, personal identification numbers, passwords, and the like remain in a state of data encryption, or otherwise deleted from data reports containing profile information.

On-line behavior is compiled using user-activity and server-activity data. Such raw data is collected and analyzed in order to compile an on-line behavior profile. Subcategories of user activity that may constitute on-line behavior illustrated within block 41 are listed and discussed from top to bottom.

Identification of Web sites visited either directly or through proxy services maybe automatically captured. Types of products purchased from those sites may also be automatically captured as well as frequency parameters associated with purchases illustrated herein as a subcategory of products purchased. Frequency of purchases may simply mean how often a purchase is made over a number of visited sites. The frequency of purchases may also mean the frequency of purchase of one particular product.

Time accessing cobrand services may also be included and incorporated in forming an on-line behavior profile. Parameters surrounding banner-ad or sponsor clicking may be incorporated in order to determine certain preferences. Finally, on-line histories may be created and maintained on virtually any category or subcategory associated with blocks 39 and 41.

In a preferred embodiment of the present invention, most if not all of the data compiled about a user is collected using automated data capturing techniques implemented during the normal course of the user accessing cobrand services. The very nature of such services enables many of these data capturing techniques to be utilized.

It will be apparent to one with skill in the art, that there may be more categories and subcategories included in this example without departing from the spirit and scope of the present invention. The inventor has outlined basic categories and basic subcategories and deems them sufficient for illustrative purposes. Therefore, the inclusion of such subcategories and categories in this example should not be construed as a limitation in any way.

It will also be apparent to one with skill in the art, that the unique cobrand architecture implemented between the service-providing entity of FIG. 1 represented by a server 15 and the plurality of cobrand partners utilizing CBS 23–27, which are maintained by the same entity, enables multifaceted profiling of users to be accomplished in automated fashion. Therefore, much manual labor and research is eliminated from the data profiling process.

Target Information Generation and Ad-Serving

Figure 3:
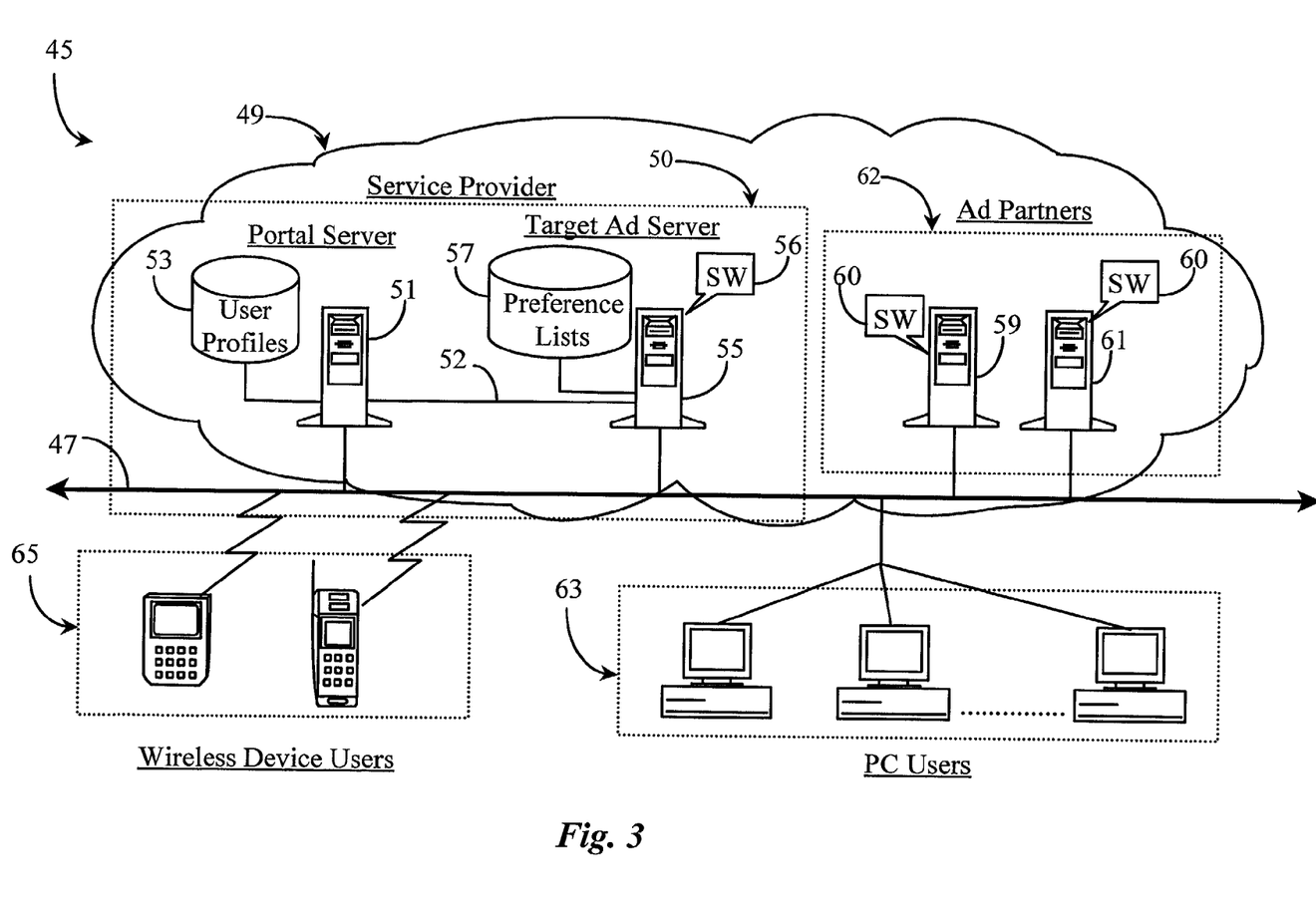
FIG. 3 is an overview of a communication network wherein target advertisement based on evolutionary profiling is practiced according to an embodiment of the present invention.

FIG. 3 is an overview of a communication network 45 wherein target advertisement based on evolutionary profiling is practiced according to an embodiment of the present invention. Communication network 45 includes a sub-network 49, which in this example is the well-known Internet network and will hereinafter be referred to as Internet 45. Internet 45 is the preferred medium used to interconnect various other components, which cooperate and communicate with each other through Internet 45 for the purpose of accomplishing the goal of the present invention, which is to provide a high level of ad compliance to user profiled states.

In a preferred embodiment of the present invention, Internet 49, represented herein as a cloud, has a service provider 50 illustrated therein and adapted to provide a unique service that benefits users of the service, which includes users and advertisers. Service provider 50 comprises a file server 51 illustrated as connected to an Internet backbone 47. Internet backbone 47 represents all lines, connection points and equipment making up the Internet network as a whole. Therefore, there is no geographic limitation the practice of the present invention. File server 51 is adapted as a portal server is so labeled. Server 51 represents the main user interface of service provider 50. A mass storage repository 53 is illustrated within the domain of service provider 50 and connected to server 51 by virtue of a direct data link. Repository 53 is adapted to hold user profile information as so labeled. User profiles stored in repository 53 are generated in part at server 51 by recording user activity at the server.

A file server 55 is illustrated within the domain of service provider 50 and is connected to backbone 47. Server 55 is adapted in part as a target ad server as so labeled, and in part as an in information generation server. A mass storage repository 57 is illustrated within the domain of service provider 50 and connected to server 55 by a high-speed data link. Repository 57 is adapted to store preference categories as so labeled. The term preference categories is defined in this specification as categories of user preferences mined from the user profiles held in repository 53.

Servers 51 and 55 are interconnected, in this example, by a separate high-speed data network 52. However, such connection is not required in order to practice the present invention as servers 51 and 55 may communicate with each other over Internet backbone 47. Mass repositories 53 and 57 are illustrated in this example as external repositories. However, in other embodiments, they may be internal repositories within their respective servers. Also in other embodiments, one repository may be used as long as it is accessible to both servers 51 and 55.

A plurality of ad partners 62 is illustrated within the domain of Internet network 49 and adapted via software and equipment to serve advertisements to target interfaces over Internet backbone 47 and through any sub-networks represented by backbone 47. Ad partners 62 cooperate with service provider 50 in order to provide dynamic target advertising to both wireless device users illustrated herein by a dotted rectangle 65, and connected PC users represented herein by a dotted rectangle labeled 63.

In this example, there are two ad servers illustrated within the domain of ad partners 62. These are server 59 and server 61. Servers 59 and 61 are both connected to Internet backbone 47. It is important to note herein that servers and 59 and 61 are adapted to serve advertisements and may be hosted by separate ad companies making up ad partners 62. It will be apparent to one with skill in the art that there may be many more ad servers represented in this example without departing from the spirit and scope of the present invention. The inventor illustrates only two ad servers in this example and deems the illustration sufficient for explanation of the present invention.

Wireless device users 65 represents users who connect to Internet backbone 47 through Internet-capable appliances such as handheld computers and cellular telephones represented herein as icons illustrated within the domain of users 65. PC users 63 represents users who connect to backbone 47 via a wired connection method such as the well-known dial-up/modem method. Sub-networks such as the well-known public-switched-telephony-network (PSTN) and cellular networks are not illustrated in this example but may be assumed to be present in represented in general by backbone 47, which includes connected sub-networks. Similarly, Internet-service-providers (ISPs) and network gateways adapted to bridge wireless networks with Internet 49 are not illustrated but may be assumed to be present.

In this example, it is assumed that users 65 and users 63 login to Internet backbone 47 and access portal server 51 to receive various data-aggregation and summaries services known to the inventor. As such, user profiles represented in mass repository 53 are profiles compiled from demographic information and activity information obtained from users 65 and 63 on an ongoing basis. Such user profiles may be assumed to be the multifaceted profiles described with reference to U.S. patent application Ser. No. 09/654,320 listed in the cross-reference section of this specification. A goal of the present invention is to summarize and package user profiles contained in repository 53 into manageable data lists containing preference categories illustrated in repository 57. This is accomplished by a software (SW) application 56 provided to execute, in this example, on server 55.

Multifaceted profiling of users may include many user aspects including but not limited to data related to queries initiated; types of data collected from various data requests; the nature and description of Web-sites accessed; and access of frequently asked questions (FAQs) pertaining to a user's particular interests. Information concerning the data and/or product providers' response, behavior, on-line senescence, and other characteristic data of providers and services is learned and recorded by the profiling software. A user's multifaceted profile constantly evolves by virtue of learning new information about a user as profiling software continually tracks and updates recording new facets of user activity and online behavior.

SW 56 is adapted to access the multifaceted user profiles contained in mass repository 53 by virtue of high-speed data network 52 and is adapted to generate concise data lists of categorized, and in some cases, prioritized user-preference categories. The preference lists are generated to be small enough to easily be propagated through Internet backbone 47. In one embodiment, SW 56 uses knowledge-based and data parsing techniques in order to summarize a multifaceted profile into a categorized and prioritized list of preferences for advertising purposes.

A software (SW) application 60 is provided to execute on ad servers hosted by entities making up ad partners 62. In this example, an instance of SW 60 resides on server 59 and an instance of SW 60 resides on server 61. SW 60 is, in a preferred embodiment, adapted to search for and deliver ads based on summary lists of categorized preferences delivered to respective host file servers 59 and 61 from server 55, which in this example, functions as an ad broker. Ads delivered to server 55 from servers 59 and 61 are selected according to the appropriate theme or themes defined in the categorized preference lists used to invoke the ad delivery.

The ads received at file server 55 are rerouted through portal server 51 into appropriate Web interfaces accessed there from by users 65 and 63 using their respective appliances. This unique ad service is dynamic in nature meaning that a new, summarized preference list is generated each time one of users 65 or 63 logs into a personalized Web page served by server 51. The generated preference list is, of course, derived from that user's multifaceted profile held in repository 53. During the time required to download a personalized page from server 51, the preference list is propagated to one or both of servers 59 and 61 where it is used as the criteria for selecting appropriate ads for routing into the personalized page. As a user's multifaceted profile evolves, so to does an associated preference list.

In another embodiment, server 55 may be adapted to function as a target information generation server, but not as an ad broker. In this case, ads delivered from server 59 and 61 would be propagated directly into server 51 during the appropriate time of Web-page service to a requesting user. However, in this embodiment preference lists are generated and sent to ad servers 59 and 61 at the beginning of page access by users.

Internet 49 is, in this example, the preferred data medium that hosts the data-aggregation and distribution system that is used to convey the preferred ad data to users via cable/modem, dial-up/modem, or satellite/modem transmission capabilities. In the embodiment depicted herein, the distribution of ad data may be made to any of users 65 employing wireless appliances such as the ones illustrated within the domain of box 65, or to new devices being made available or in development at the time of this writing. Likewise, ad distribution may be accomplished via Internet 47 or the Internet and cable/modem networks to users of personal computers, Web TVs, computerized workstations, and other computer embodiments having network browsing and display capabilities. All that is required to practice the invention is a user have an appliance capable of accessing backbone 47 and server 51 through any one of a variety of known Internet-access methods.

In one embodiment of the present invention, users 65 and 63 may access the unique, dynamic ad service by connecting to any one of a plurality of cobranded-interface servers represented in FIG. 1 of Ser. No. 09/654,320 as cobrand servers (CBS) 23–27. It is noted herein, that cobranded servers may be utilized in conjunction with a main portal server (51) as user interfaces to which ads may be delivered.

In one embodiment of the present invention SW 56 executing on server 55 within the domain of service provider 50 has the capability of generating categorized preference lists and the capability of polling ad sources (servers 59 and 61) for appropriate ads. This may be accomplished through an established prioritization scheme developed by service provider 50 and ad partners 62. In this case, ads delivered into a particular interface may be sourced from more than one server. The exact prioritization scheme will depend on the nature of agreements forged. In this embodiment, preference categories held in repository 57 may not actually be sent to servers 59 or 61 of ad partners 62. Rather, they may be used as search criteria for a search engine implemented as part of SW 56. Such a search engine or polling software may be adapted to identify and retrieve ads from a plurality of ad servers represented by server 59 and 61 with the ads rated by percentage of match to the preference criteria.

According to another embodiment of present invention, SW 60 may be enhanced with a search engine adapted to search ads hosted by a host server 59 or 61. In this case, a categorized preference list is sent to an appropriate ads server (59, 61) according to contractual arrangement where in an internal search comprising ad identification and delivery is performed based on the received preference criteria.

A software application (not shown) provided to execute on server 51 operates in conjunction with mass storage repository 53 to obtain multi-faceted user profiles held in repository 53 (Ser. No. 09/654,320). As described in an embodiment of related application Ser. No. 09/654,320 such an application has the ability to record activity information related to any data request involving any of the servers navigating ad partners, data sources, and message traffic. In addition, the capability includes the ability to aggregate and categorize types of data requested and/or collected, types of inquiries initiated and data provided, and the variable categories and cost envelopes of purchases and/or deliveries. Moreover, identification and recording of the different types of interface devices employed by users 63 and 65 is also included in multi-faceted profiling.

It will be apparent to one with skill in the art that SW applications 56 and 60 may be provided of varying capabilities without departing from the spirit and scope of the present invention. For example, whether SW 56 includes polling capabilities, or whether preference lists are simply delivered to ad sources whereupon an internal ad search and delivery is conducted is left to practical design and implementation. The capability of delivering dynamic ads according to evolving user preferences wherein such ads are decided on during user-login and download of a WEB page represents a contribution to the art that is, at the time of this writing, not available.

Figure 4:
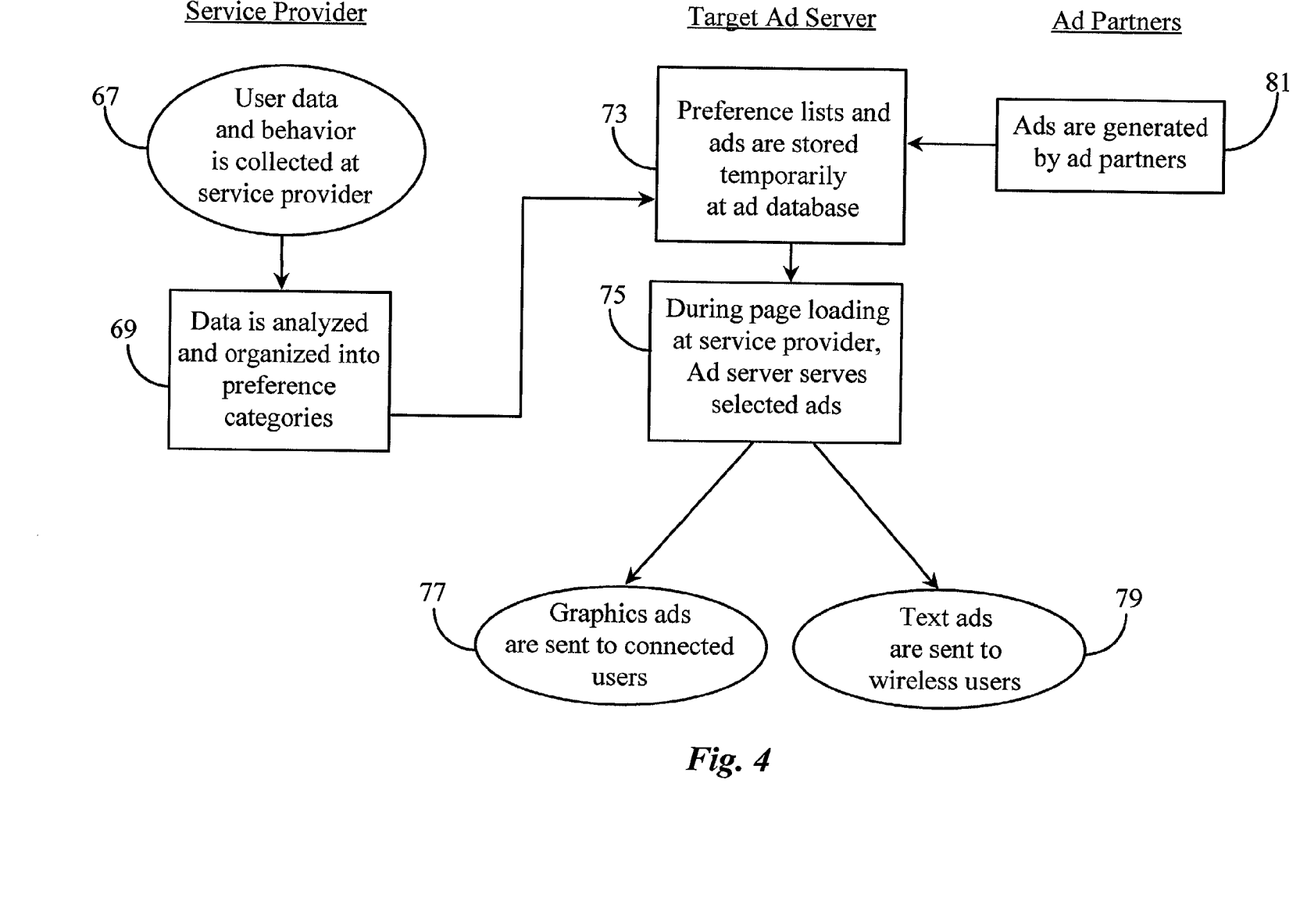
FIG. 4 is a process-flow diagram illustrating various steps for profiling and ad serving based on received profile information according to an embodiment of the present invention.

FIG. 4 is a process-flow diagram illustrating various steps for dynamic ad serving based on received profile information according to an embodiment of the present invention. At step 67, multi-faceted profiling is collected and recorded at the location of the service provider (50). Step 67 is an ongoing process including collection and recording of user data, on-line behavior characteristics, Internet activity, and preferences. The initial data is obtained from user-supplied information and stored by the service provider in mass storage repository 53 connected to portal server 51 of FIG. 3.

Initial profile data is augmented each time a user initiates on-line activity by supplementing the basic profile data with information related to user generated queries, investigations, purchases, on-line recreational activities and so on. It is noted herein that in addition to profile data obtained by virtue of automated process, profile data obtained from manual process may also be included as referenced in U.S patent application Ser. No. 09/654,320.

At step 69, a specific user profile is accessed and mined for summary data, which is organized into a categorized and, in some cases, prioritized preference list. Step 69 results from a user request and process of logging into a personalized Web interface served by portal server 51 of FIG. 3, or from a described cobrand server functioning as the interface. Data (profile) access, mining and organization is accomplished by software (SW 56) through the use of a knowledge-base technique or other rules-base scheme. For example, a knowledge database may contain a plurality of listed categories and descriptive keywords associated with those categories. Category titles may be adopted into a preference list by priority of number of matching hits to descriptive words contained in a multifaceted profile.

The results obtained in step 69 will be slightly different each time the process occurs by virtue of continual updating and purging of a user's multifaceted profile. Incorporation of new user preferences, traits, habitual or spontaneous site visits, ad or sponsor clicking and so on this ultimately reflected in a categorized preference list generated in step 69.

At step 73, a categorized preference list is temporarily stored in a repository (repository 57, FIG. 3) connected to a target ad server (server 55, FIG. 3). It is noted herein, that step 73 reflects one embodiment wherein preference lists are not sent out to ad servers but are held at the service provider. Also at step 73, ads received from various ad partners in step 81 are collected and classified into appropriate preference categories and stored in an ad database, which may be searched using a preference list as a search criteria and a search function provided as part of SW 56. In this case, ad identification and prioritized association with a received preference list is performed by one machine within the domain of the service provider.

According to another embodiment, step 73 comprises immediate receipt and propagation of preference lists to ad servers (59 and 61 of FIG. 3) hosted by ad partners (62 of FIG. 3) wherein ad identification, association and delivery according to data contained in a preference list is performed by distributed software (60 of FIG. 3). The preference category and user profile information 71 are continually updated and provided to the target ad server where the user profiles are catalogued and matched with the products and services of the ad partners, FIG. 3 element 59.

Referring now back to the process described in this example, ads generated by ad partners in step 81 are made available to target ad server (51) by various agreements forged between the parties involved. The provided ads can be associated under generic categories or can be, in some cases, personalized to various users or groups of users based on demographic data obtained previously obtained during repeated execution of dynamic ad serving. Available ads are limited only by the agreements between the ad partners and the service providers and in all cases are established with the needs and preferences of the users in mind. The products and services of the ad partners are made available as pop-up banner ads, static banner ads, pop-up text ads, static text ads, or other inventive techniques developed by the parties involved.

Step 73 provides, in this example, both the receipt of dynamic user-preference lists and the classification and collation of ads into preference categories (ongoing) and matching of appropriate ads to preference lists in process. Matching of stored ads to received preference lists is accomplished using a database search function. In one embodiment, the search function employs a priority-coding scheme to expedite matching of ads to user-preference lists.

At step 75, the target ad server serves selected ads to the appropriate user interface identified in the particular user-preference list. In this example, the target ad server (server 51 of FIG. 3) functions as an ad broker. However, in other embodiments, ads may be served directly to user interfaces from remote ad servers. In a case such as this, user preference lists would be propagated directly to such ad servers and server 51 of FIG. 3 would be responsible only for target information generation (generating preference lists). It is noted herein, that step 69, 73, and 75 occur during the small amount time required for a user to login and access a personalized Web page.

At step 77, graphical ads are delivered to user interfaces associated with wired PCs, laptops, and other appliances having suitable capabilities for graphical display. At step 79, textual ads are delivered to wireless users accessing their personalized pages via cellular phones, handheld computers, two-way pagers, and other Internet-capable wireless appliances. It is noted herein that in some cases of display, graphical ads may be reduced somewhat for wireless interfaces but still retain some graphical integrity. Similarly, interfacing devices suited for more elaborate graphical displays may still, in some cases, receive only text ads.

It will be apparent to one with skill in the art, that the process steps illustrated in this example are exemplary only and may be presented in a number of different orders and descriptions representing various embodiments without departing from the spirit and scope of the present invention. For example, in an embodiment where ad matching to preference criteria is performed outside of the domain of the service provider such as within the domain of ad partners, a step would be included for delivering categorized preference lists to various target ad servers hosted by associated ad partners. The inventor intends that the exemplary steps illustrated herein represent just one of many possible processes that may define dynamic ad serving based on evolving user preferences.

In one embodiment of the present invention, the process of polling data sources for data that may be matched to generated preference lists may incorporate embodiments wherein banner and text ads are just a few of the types of advertisements that may be routed into an interface. For example, in addition to ads normally served by ad servers, the method and apparatus of the present invention may be expanded to include email advertisements and other types of instant messaging advertisements.

In still another embodiment of the present invention the existence of a concise and packaged preference list can be utilized in addition to search phrases or keywords entered into a conventional search engine in order to provide a list of URLs that most closely and match actual user preferences that may in some way relate to the executed data search. In this case distributed software would be required at the database locations hosted by the entities providing the data search services. In all aspects of the present invention, the processes of generating a preference list, identifying and associating ads to the preference list, and delivering the selected ads to the user on all accomplished during the time window a user utilizes in the process of accessing and downloading a personalized Web page. Ads presented within a personalized Web page will evolve with regards to content at the rate that the associated user profile evolves with regards to content.

The method and apparatus of the present invention may be practiced on any DPN that supports the appropriate Internet protocols. Furthermore, there's no limit to the number of cobrand partners, or end-users that may participate in the practice the present invention. Therefore, the method of the present invention should be afforded the broadest possible scope under examination. The spirit and scope of the present invention is limited only by the claims that follow.

What is claimed is:

1. An advertisement selection and delivery system for selecting advertisements based on profile information and rendering the advertisements as accessible to a user operating a network-capable appliance connected to a data-packet-network comprising:

a first server node connected to the network the first server node functioning as a user access point on the network;

an instance of software residing on the first server capable of recording any user data-packet-network navigation activity data routed through the first server including, at least, transaction activity occurring at any destination Web sites the user freely chooses to navigate to;

a mass storage repository accessible to the first server node, the repository for storing the user activity data and serving user profile data accumulated, at least, by accessing the stored user activity;

a second server node connected to the network, the second server node for generating user preference data;

at least one advertisement server connected to the network, the advertisement server for serving advertisement data;

a software application for generating user preference lists and performing advertisement selection; and at least one network-capable appliance connected to the network, the network-capable appliance for receiving the advertisement data;

wherein a user operating the network-capable appliance accesses the first server node and receives the advertisement data, the advertisement data selected for service by matching the user profile data to stored advertisements and rendered accessible to the user during the time of user access to the system from the network-capable appliance.

2. The advertisement selection and delivery system of claim 1, wherein the data-packet-network is the Internet network.

3. The advertisement selection and delivery system of claim 2, wherein the first server node and the second server node are in addition to being connected to the Internet, connected to each other by a separate dedicated network.

4. The advertisement selection and delivery system of claim 3, wherein the software application is distributed in part on the second server node and in part on the at least one advertisement server.

5. The advertisement selection and delivery system of claim 4, wherein the part of the software application executing on a second server node directs generation of user preference lists and the part of the software application executing on teat least one advertisement server performs the advertisement selection according to a user preference lists obtained from the second server.

6. The advertisement selection and delivery system of claim 3, wherein the software application resides in whole and executes on the second server node and advertisement selection is preformed by the second server node using advertisements delivered thereto from the at least one advertisement server.

7. The advertisement selection and delivery system of claim 6, wherein the second server node also serves the selected advertisements.

8. The advertisement selection and delivery system of claim 2, wherein the first server node is a cobranded server node servicing clients of a cobrand partner to the entity hosting the system.

9. The advertisement selection and delivery system of claim 2, wherein the advertisements include e-mail messages.

10. The advertisement selection and delivery system of claim 9, wherein the advertisements include instant messages.

11. The advertisement selection and delivery system of claim 10, wherein the advertisements include banner advertisements.

12. The advertisement selection and delivery system of claim 2, wherein the network-capable appliance accesses the system trough a wireless network.

13. The advertisement selection and delivery system of claim 2, wherein the preference lists are generated using a knowledge base data system.

14. The advertisement selection and delivery system of claim 13, wherein the preference lists are used as search criteria in conjunction with a search engine.

15. A preference-data generation server for generating preference data using data mined from user profile data comprising:

a data port for receiving user profile data;

a data port for accessing a knowledge database; and a software application for mining the user profile data and for generating preference summaries by equating the mined profile data to pre-established preference categories listed in the knowledge database;

wherein the profile data is accumulated, at least, by monitoring user navigation behavior on the Internet, including, at least, transaction activity occurring at any destination Web sites the user freely chooses to navigate to.

16. The preference-data generation server of claim 15, wherein the preference summaries are generated in the form of categorized and prioritized data lists.

17. The preference data generation server of claim 16 further comprising:
 a data port for receiving pre-configured advertisement data;
 a data port for serving advertisement data; and
 a software application for matching the advertisement data to individual ones of generated data lists and for selecting the advertisement data most closely matching the generated data lists for service.

18. The preference-data generation server of claim 17, wherein the matching advertisement data is served to a network-access point established on the Internet.

19. The preference-data generation server of claim 18, wherein the network-access point is a server node.

20. The preference-data generation server of claim 16 further comprising:
 a data port for serving the prioritized data lists.

21. The preference-data generation server of claim 20, wherein the prioritized data lists are served to at least one advertisement server operating on the Internet.

22. A method for dynamically serving advertisement data based on user profile information to a user interface maintained on the Internet comprising the steps of:
 (a) compiling and storing the user profile information on an ongoing basis, by monitoring any user navigation behavior on the Internet including, at least transaction activity occurring at any destination Web sites the user freely chooses to navigate to;
 (b) accessing the user profile information in order to mine the information;
 (c) mining the accessed user profile information for preference data;
 (d) formulating the preference data into a concise summary-data list;
 (e) selecting pre-configured advertisements from a database containing stored advertisements, the selection accomplished by matching the advertisements to data contained in the summary-data list; and
 (f) serving the selected advertisements to the user interface.

23. The method of claim 22 wherein in step (a), compilation of user profile information is augmented through manual data procurement methods.

24. The method of claim 22 wherein steps (b)–(f) are performed as a sequence launched as a result of the profile the user connecting to an accessing the user interface using a network-capable appliance.

25. The method of claim 24 wherein in step (c), data mining is accomplished trough a parsing method.

26. The method of claim 25 wherein in step (c), the preference data is categorized and prioritized according to pre-configured preference categories related to types of advertisements.

27. The method of claim 26 wherein in step (d), the summary-data list is of the form that can be propagated through the network.

28. The method of claim 27 wherein in step (d), the summary-data list is sent to an advertisement server wherein the advertisement server performs steps (e) and (f).

29. The method of claim 26 wherein steps (c)–(f) are accomplished by a single server node connected to the network.

30. The method of claim 24 wherein in step (e), the advertisements are generated to fit the summary-data list and are of the form of instant messages advertisements.

31. The method of claim 24 wherein in step (e), the advertisements are generated to fit the summary-data list and are in the form of e-mailed advertisements.

* * * * *